July 22, 1941.     J. R. HOLMES     2,249,957

VEHICLE HEATING AND VENTILATING APPARATUS

Filed June 30, 1938

Inventor
John Ralph Holmes

Attorneys

Patented July 22, 1941

2,249,957

UNITED STATES PATENT OFFICE 2,249,957

VEHICLE HEATING AND VENTILATING APPARATUS

John Ralph Holmes, Lockport, N. Y., assignor to General Motors Corporation, Detroit, Mich., a corporation of Delaware Application June 30, 1938, Serial No. 216,699

2 Claims. (Cl. 98—2)

This invention relates to automobile heating and ventilating apparatus, and has for an object the provision of such apparatus which may be utilized to heat the interior of the automobile body, or to defrost or defog the windshield either with heated air taken from within the body or with fresh air taken from outside the body or with a mixture of air taken from both places, or which may also be used to ventilate the body compartment either with fresh air taken from outside the body or with a mixture of such fresh air and heated air taken from within the body, in order that the temperature of the air used for such purposes may be regulated to produce maximum comfort for the occupants of the vehicle.

A further object is to provide such an apparatus which is so devised that the interior of the automobile may be heated at the same time that it is being ventilated or that the windshield is being defrosted or defogged.

A still further object is to provide such an apparatus which will permit the interior of the automobile to be ventilated or the windshield to be defrosted or defogged with either fresh air from outside the body or with heated air from within the body or with a mixture of air from the two sources, regardless of whether the automobile is in motion. My improved heating and ventilating apparatus will function just as well for all of its intended purposes when the vehicle is standing still as when it is moving. This is an important advantage, since many of the automobile heating and ventilating devices shown in the prior art depend upon the motion of the vehicle through the surrounding atmosphere to create a pressure which will force air into the car body, therefore they will only operate properly when the vehicle is in motion, and obviously it may sometimes be desired to either ventilate the interior of the body or to defrost or defog the windshield when the car is standing still.

Other objects and advantages of my invention will be apparent upon reference to the specification and accompanying drawing, in which.

Figure 1:
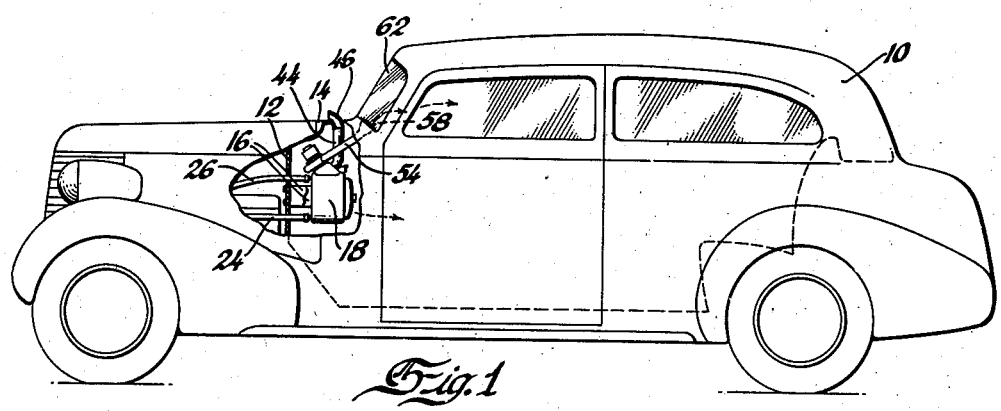
Fig. 1 is a view of an automobile, with parts broken away, showing my improved heating and ventilating apparatus associated therewith.

The reference numeral 10 indicates the body portion of an automobile, in which 12 is the usual partition or dash separating the engine compartment from the body compartment, and 14 is the cowl portion of the automobile. Supported on the dash by brackets 16 is a heat exchange member 18, which consists of a casing 20 within which is located a heat radiating member 22 through which hot water from the engine cooling circulating system is adapted to flow, the hot water being conducted from the engine to the member 22 through the pipe 24 and returning to the cooling circulating system through the pipe 26. An electric motor 28, supported in an opening formed in the central portion of the heat radiating member, drives a fan 30 which is adapted to draw air in through a large opening 32 in the casing 20 and to force this air through horizontally extending passages formed in the heat radiating member, the air becoming heated when flowing through such passages, and being discharged through a large opening 34 formed in the casing 20, adjustably pivoted deflectors 36 being provided to cause the heated air to be discharged in any desired direction as it leaves the heat exchange member.

Mounted on the casing 20 is a member 38 which, with the adjacent wall of the casing, forms a chamber 40 which communicates with the space inside the casing by means of an opening or passage 42 formed in the wall of the casing. This chamber is also connected with the outside of the automobile by means of a conduit 44, the outer open end 46 of which extends through the cowl 14. Supported on the member 38 is a centrifugal blower 47, driven by an electric motor 48, and the inlet of this blower communicates with the chamber 40 through a passage 50. The outlet 52 of the blower has connected to it conduits 54 and 56 which lead up to discharge openings 58 and 60, located at the inside and bottom of the windshield 62. These discharge openings may either be formed in the top horizontally extending portion of the instrument panel or in the hollow garnish molding which is located inside the windshield to hold the latter in place.

Figures 2, 3:
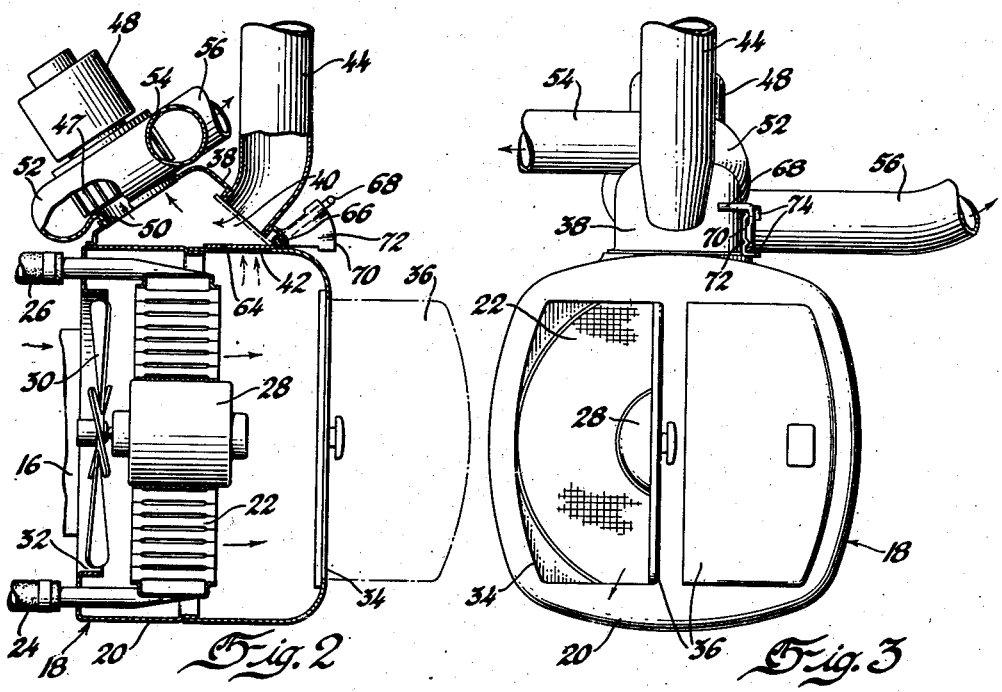
Fig. 2 is a sectional view, in a vertical plane, through the heating and ventilating apparatus, showing the latter on a larger scale.
Fig. 3 is a side elevational view of the structure shown in Fig. 2.

Located in the chamber 40, in a position between the inner end of the conduit 44 and the passage 42, is a valve 64 which is pivotally supported at 66 on the member 38, and which has an operating handle 68 extending outside the chamber; so that the valve may be set to different positions whereby either the passage 42 may be closed, as indicated by the full line position of the valve in Fig. 2, or the inner end of the conduit 44 may be closed, as indicated by the dotted line position of the valve, in the same figure. A plate or bracket 70, supported on the member 38, and having detents 72 and stop lugs 74 formed on it, is provided to form a means to hold the handle 68 in whatever position it is adjusted to, and as shown in Fig. 2, this plate or bracket may have indicating marks formed on it to show which position the valve 64 is adjusted to.

The operation of the apparatus for merely heating the interior of the body compartment is like that of the usual well known forms of hot water car heaters now in such general use. The fan 30 is driven by the electric motor 28, the speed of which is controlled by a variable speed switch, which is not shown since it is of conventional construction, and rotation of the fan serves to cause air from within the body compartment to be drawn in through the opening 32 in the casing, which air is forced through the horizontally extending passages in the heat radiating member 22 where it becomes heated, after which it is forced out through the opening 34 in the casing, the deflectors 36 being capable of adjustment to any angular position to direct the heated air where desired.

When the apparatus is operated in this manner, all of the air which is being heated and circulated in the body compartment is merely recirculated air. Very often it is desired that some fresh air from outside the body compartment be admitted for the purpose of ventilating the latter, and while this may be done by opening the car windows, this is usually objectionable since it creates drafts. In my improved heating and ventilating apparatus, this may be accomplished by adjusting the handle 68 so that the valve 64 will uncover the inner end of the conduit 44, and starting the blower 47, whereupon fresh air from outside the vehicle will be drawn in through the open end 46 of the conduit 44 into the chamber 40, from which the blower will withdraw it and will force it through the conduits 54 and 56 up to the discharge openings 58 and 60 located at the bottom and inside of the windshield. The air discharged through these openings will flow upwardly over the inner surface of the windshield, and due to the rearward slope or slant of the latter this air will be caused to circulate rearwardly through the body over the heads of the occupants of the vehicle so that no drafts will be felt, but at the same time the interior of the body will be thoroughly ventilated by the addition of the fresh air taken in.

The amount of such air taken in from outside the body may be regulated either by varying the speed of the electric motor which drives the blower 47, a variable speed switch of conventional construction (not shown) being provided for this purpose, or by altering the position of the valve 64 so that it will uncover more or less of the inner end of the conduit 44. Obviously, when the valve is set so that it closes the passage 42 in the casing 20, all of the air being discharged by the blower is drawn in through the conduit 44 from outside the vehicle, whereas if the valve is set to an intermediate position between the passage 42 and the inner end of the conduit 44, some of the air being discharged by the blower will be drawn in from outside the vehicle through the conduit 44 and the balance will be drawn through the passage 42 from within the heater casing 20, and will therefore be heated air, and this heated air by becoming mixed in the chamber 40 with the fresh air from outside will raise the temperature of the latter. It will therefore be seen that the temperature of the air being discharged through the opendings 58 and 60 for ventilating purposes may be controlled by regulating the position of the valve 64, so that more or less heated air is caused to become mixed with the fresh air being drawn in from outside the body, as desired.

If it is desired to ventilate the body compartment with some heated recirculated air and some fresh air taken in from outside, and it is not desired to have the fan 30 operating, the deflectors 36 may be set to positions wherein they will close off the opening 34, and the blower 47 will then serve to draw air through the horizontally extending passages in the heat exchange member, through the passage 42 in the casing and into the chamber 40, where the heated air will become mixed with fresh air being drawn in from outside the vehicle through the conduit 44, assuming that the valve 64 is set to a position whereby the inner end of the conduit 44 is partially uncovered.

Since the air which is discharged through the openings 58 and 60 by the blower flows upwardly over the inner surface of the windshield, it may be utilized to remove frost or ice from the outside of the windshield or to remove condensed vapor, commonly referred to as "fog," or frost, from the inside of the windshield. In the same manner as described above in connection with the operation of the apparatus for ventilating purposes, the quantity, velocity and temperature of the air discharged through the openings 58 and 60 for windshield defrosting or defogging purposes may be regulated by varying the position of the valve 64 and the speed of operation of the blower 47, so that more or less of the air being discharged by the blower is taken from inside or outside the body. Under some temperature conditions, when fog is to be removed from the inside surface of the windshield, it may be considered desirable to not employ any heated air for this purpose, in order not to raise the temperature of the air within the car body, in which case the valve 64 would be set to the position wherein it will completely close the passage 42, so that all of the air discharged by the blower will be drawn in from outside the vehicle through the conduit 44, and the quantity and velocity of the air discharged through the openings 58 and 60 may be controlled by varying the speed of the blower 47.

Under other conditions, such as when frost or ice is frozen to the outer surface of the windshield, it is desirable to have air of relatively high temperature discharged against the inner surface of the windshield, in order that the latter may become heated as quickly as possible to melt the frost or ice, in which case, the valve 64 would be set to the position wherein it would close the inner end of the conduit 44, so that all of the air being discharged by the blower through the openings 58 and 60 would be heated air drawn through the passage 42. To get relatively large quantities of heated air as quickly as possible, it sometimes might be considered desirable to adjust the deflectors 36 so that they would close the opening 34 so that all of the heated air from within the casing 20 would flow through the passage 42 into the chamber 40 and thence into the blower. This result might be further assisted by starting the fan 30 in operation to increase the amount of air which would be forced through the heat radiating member 22.

It will be understood of course that the apparatus may be used to heat the interior of the vehicle at the same time that the latter is being ventilated or that the windshield is being defrosted or defogged, and that since the air being utilized for ventilating or windshield defrosting or defogging purposes is circulated by the blower 47, the apparatus will operate just as satisfactorily for these purposes when the vehicle is standing still as when it is in motion.

Figure 4:
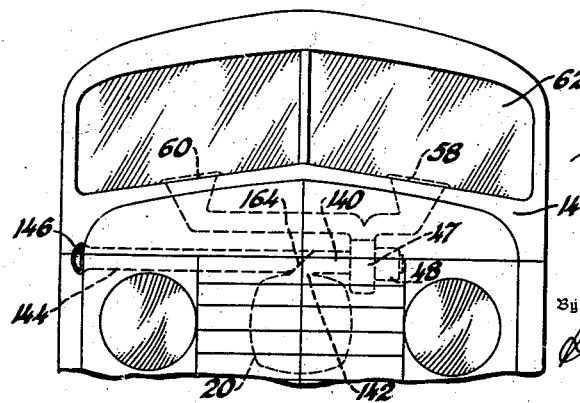
Fig. 4 is a front view of an automobile, showing a modification of the invention.

If for reasons of appearance, or for any other reason it is not desired to have the outer end of the conduit which conducts air from outside the body into the blower, located at the top of the cowl, this opening may be placed elsewhere, it merely being necessary that it be located some place where fresh air from outside the body compartment may be conducted to the blower. An alternative arrangement is shown in Fig. 4, wherein conduit 144, which conducts the outside air to the blower, has its outer open end 146 located at the side of the automobile.

In this showing, the parts are illustrated somewhat diagrammatically, 140 being the chamber the inlet side of the blower communicates with, 142 being the passage connecting the chamber with the inside of the heater casing 20, and 164 being the valve which may be set to close or partially close either the passage 164 or the inner end of the conduit 144.

While I have disclosed a particular form of my invention, it will be understood that it may be embodied in other forms without departing from the spirit or essential characteristics thereof. The present embodiment is therefore to be considered as being merely illustrative and not restrictive, the scope of the invention being defined by the appended claims rather than by the foregoing description, and all changes which come within the meaning and range of equivalency of the claims are therefore intended to be covered thereby.

I claim:

1. A heating and ventilating apparatus for an automobile, comprising a heat exchange member, a fan adapted to force air through said heat exchange member into the body compartment of the automobile for heating the latter, a chamber located adjacent to the heat exchange member, a passageway connecting the chamber with the heat exchange member, a second passageway leading from the outside of the body compartment to said chamber, a blower adapted to withdraw air from said chamber and to discharge such air into the body compartment for ventilating the latter, and means for closing or partially closing either the first or the second of the passageways leading into the chamber.

2. A heating and ventilating apparatus for an automobile, comprising a heat exchange member, a blower, a passageway connecting the inlet of the blower with the heat exchange member, a second passageway connecting the inlet of the blower with the outside of the automobile, an adjustable valve adapted when set in one position to close the first named passageway and when set in another position to close the second named passageway, and a conduit adapted to conduct air from the blower to a discharge opening located adjacent to the windshield.

JOHN RALPH HOLMES.